United States Patent
Kim et al.

(10) Patent No.: US 12,214,532 B2
(45) Date of Patent: Feb. 4, 2025

(54) ELECTRONIC DEVICE INCLUDING HOUSING AND METHOD FOR MANUFACTURING THE HOUSING

(71) Applicant: Samsung Electronics Co., Ltd., Suwon-si (KR)

(72) Inventors: Changsu Kim, Suwon-si (KR); Hyunjung Jung, Suwon-si (KR); Hangyu Hwang, Suwon-si (KR); Sangsik Na, Suwon-si (KR); Hongbum Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 17/554,664

(22) Filed: Dec. 17, 2021

(65) Prior Publication Data

US 2022/0184868 A1 Jun. 16, 2022

Related U.S. Application Data

(63) Continuation of application No. PCT/KR2021/018968, filed on Dec. 14, 2021.

(30) Foreign Application Priority Data

Dec. 16, 2020 (KR) .......................... 10-2020-0176665

(51) Int. Cl.
*B29C 45/37* (2006.01)
*H04M 1/02* (2006.01)
*B29K 69/00* (2006.01)

(52) U.S. Cl.
CPC ......... *B29C 45/372* (2013.01); *H04M 1/0202* (2013.01); *B29K 2069/00* (2013.01)

(58) Field of Classification Search
CPC ....... H05K 7/1427; G06F 1/181; B32B 27/30; B32B 27/308; B44C 1/22; B44C 1/228
See application file for complete search history.

(56) References Cited

U.S. PATENT DOCUMENTS

| 2010/0021724 A1 | 1/2010 | Lee et al. |
| 2010/0104786 A1 | 4/2010 | Chiang et al. |

(Continued)

FOREIGN PATENT DOCUMENTS

| JP | H11-254898 A | 9/1999 |
| JP | 2006-231136 A | 9/2006 |

(Continued)

OTHER PUBLICATIONS

International Search Report and Written Opinion dated Mar. 23, 2022, issued in International Patent Application No. PCT/KR2021/018968.

*Primary Examiner* — Zachary M Davis
(74) *Attorney, Agent, or Firm* — Jefferson IP Law, LLP

(57) ABSTRACT

An electronic device is provided. The electronic device includes a housing; and a coating layer formed on at least a portion of a surface of the housing, wherein the coating layer comprises a paint, the paint including a one-component acrylate-based paint having a property of being cured by an ultraviolet (UV) light, or a one-component or two-component paint containing acryl and urethane and having a property of being cured by heat, wherein the coating layer has a pattern structure including an uneven pattern through laser processing on a portion of a coating film formed by applying the paint, and wherein two or more regions having different glossiness may exist on the surface of the housing by the pattern structure of the coating layer.

20 Claims, 13 Drawing Sheets

(56) References Cited

U.S. PATENT DOCUMENTS

| | | | |
|---|---|---|---|
| 2013/0209736 A1 | 8/2013 | Cao et al. | |
| 2015/0314327 A1 | 11/2015 | Shin et al. | |
| 2018/0111227 A1* | 4/2018 | Shimada | B23K 26/0006 |
| 2018/0370276 A1* | 12/2018 | Goto | B44C 1/18 |

FOREIGN PATENT DOCUMENTS

| | | |
|---|---|---|
| JP | 2010-100052 A | 5/2010 |
| JP | 3233856 U | 9/2021 |
| KR | 10-2008-0026298 A | 3/2008 |
| KR | 10-2013-0019679 A | 2/2013 |
| KR | 10-2014-0074642 A | 6/2014 |
| KR | 10-1417797 B1 | 7/2014 |
| KR | 10-1598337 B1 | 3/2016 |
| KR | 10-2046528 B1 | 11/2019 |
| KR | 10-2021-0045292 A | 4/2021 |

\* cited by examiner

ELECTRONIC DEVICE INCLUDING HOUSING AND METHOD FOR MANUFACTURING THE HOUSING

CROSS-REFERENCE TO RELATED APPLICATION(S)

This application is a continuation application, claiming priority under § 365(c), of an International application No. PCT/KR2021/018968, filed on Dec. 14, 2021, which is based on and claims the benefit of a Korean patent application number 10-2020-0176665, filed on Dec. 16, 2020, in the Korean Intellectual Property Office, the disclosure of which is incorporated by reference herein in its entirety.

TECHNICAL FIELD

The disclosure relates to an electronic device including a housing and a method for manufacturing the housing.

BACKGROUND ART

As electronic devices become more closely related to daily life and their fields of use continue to expand, not only functions of electronic devices but also aesthetics of appearances are becoming more important. In order to enhance the aesthetics of products and emphasize design differentiation, efforts to implement new visual or tactile textures on exterior elements (e.g., a housing) of electronic devices are being made in various ways.

The above information is presented as background information only to assist with an understanding of the disclosure. No determination has been made, and no assertion is made, as to whether any of the above might be applicable as prior art with regard to the disclosure.

DISCLOSURE

Technical Problem

The electronic device may include a housing including a front surface, a rear surface, and a lateral surface surrounding a space between the front and rear surfaces. Alternatively, the electronic device may include a housing having a structure that forms a front surface, a rear surface, and a part of a lateral surface.

On the housing of the electronic device, a dual texture of glossy and matte may be realized through corrosive processing in some areas during injection molding of a base material. However, this method may incur scratches and contamination on a specular surface (glossy region). After such corrosive processing, additional processing may be performed to prevent contamination and scratches, but in this case, both the glossy and matte areas appear glossy, and the effect of the dual texture may disappear.

The housing of the electronic device may realize the dual texture through glossy and matted painting processes performed on a surface of the housing. However, in such separate painting processes, paint scattering occurs and thereby an interface between glossy and matted areas is not neatly formed. In addition, it may not be possible to precisely implement a standardized pattern according to a difference in texture between the glossy and matted textures.

Aspects of the disclosure are to address at least the above-mentioned problems and/or disadvantages and to provide at least the advantages described below. Accordingly, an aspect of the disclosure is to provide a housing including areas having different glossiness, an electronic device including the housing, and a method for manufacturing the housing.

Additional aspects will be set forth in part in the description which follows and, in part, will be apparent from the description, or may be learned by practice of the presented embodiments.

Technical Solution

In accordance with an aspect of the disclosure, an electronic device is provided. The electric device includes a housing; and a coating layer formed on at least a portion of a surface of the housing, wherein the coating layer comprises a paint, the paint including a one-component acrylate-based paint having a property of being cured by an ultraviolet (UV) light, or a one-component or two-component paint containing acryl and urethane and having a property of being cured by heat, wherein the coating layer has a pattern structure including an uneven pattern through laser processing on a portion of a coating film formed by applying the paint, and wherein two or more regions having different glossiness exist on the surface of the housing by the pattern structure of the coating layer.

Advantageous Effects

Various embodiments of the disclosure can provide an electronic device in which contamination and scratches are prevented and multiple textures of glossy and matte are implemented through a housing including a coating layer having an uneven pattern formed with an uneven depth of a predetermined range. Furthermore, an electronic device in which a standardized pattern based on a difference in glossiness is elaborately implemented can be provided to offer a differentiated aesthetic feeling to the user. In addition, various effects explicitly or implicitly appreciated through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
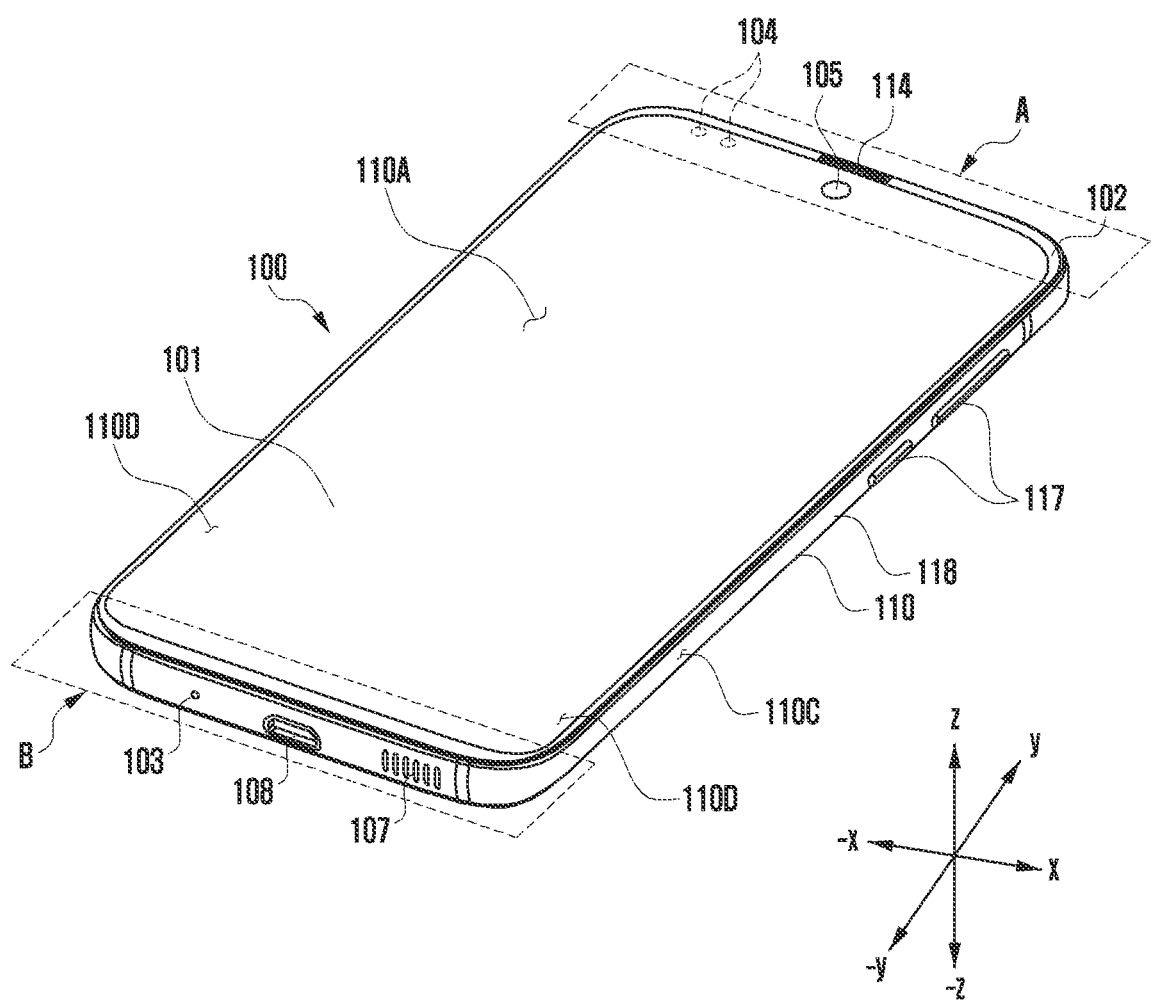
FIG. 1A is a perspective view illustrating a front surface of an electronic device according to an embodiment of the disclosure.
Figure 1B:
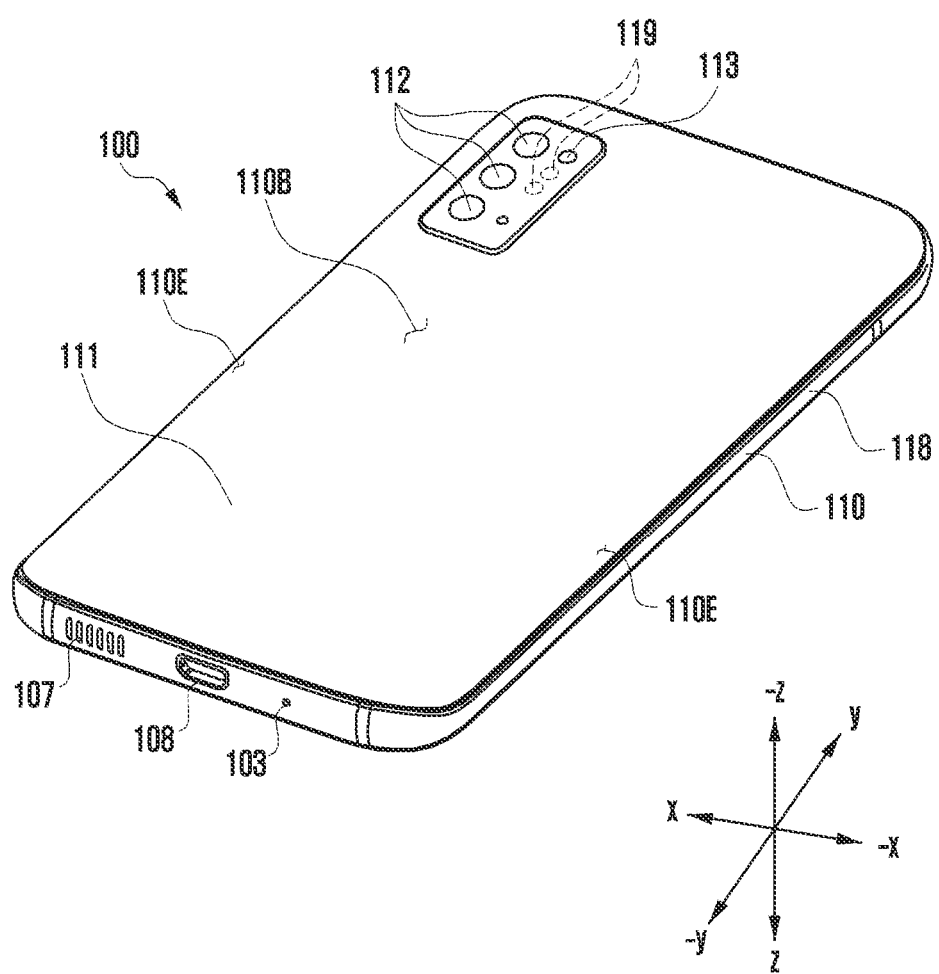
FIG. 1B is a perspective view illustrating a rear surface of an electronic device according to an embodiment of the disclosure.

FIG. 1A is a perspective view showing a front surface of an electronic device according to an embodiment of the disclosure. FIG. 1B is a perspective view showing a rear surface of the electronic device shown in FIG. 1A according to an embodiment of the disclosure.

Referring to FIGS. 1A and 1B, an electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The electronic device 100 may include at least one of a display 101, audio modules 103, 107 and 114, sensor modules 104 and 119, camera modules 105, 112 and 113, a key input device 117, an indicator, and connector holes 108 and 109. The electronic device 100 may omit at least one (e.g., the key input device 117 or the indicator) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, a proximity sensor, or an illuminance sensor.

The camera modules 105, 112 and 113 may include a first camera device (e.g., camera module 105) disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The electronic device 100 may not include some or all of the key input device 117 described above, and the key input device 117 which is not included may be implemented in another form such as a soft key on the display 101. The key input device 117 may include the sensor module disposed on the second surface 110B of the housing 110. In another embodiment, the key input device 117 may be implemented using a pressure sensor included in the display 101.

The indicator may be disposed on the first surface 110A of the housing 110. For example, the indicator may provide status information of the electronic device 100 in an optical form. The indicator may provide a light source associated with the operation of the camera module 105. The indicator may include, for example, a light emitting diode (LED), an infrared (IR) LED, or a xenon lamp.

The connector holes 108 and 109 may include a first connector hole 108 adapted for a connector (e.g., a universal serial bus (USB) connector or an interface connector port module) for transmitting and receiving power and/or data to and from an external electronic device. The connector hole 108 may include a second connector hole 109 (not shown) adapted for a connector (e.g., an earphone jack) for transmitting and receiving an audio signal to and from an external electronic device.

Some sensor modules of camera modules 105 and 112, some sensor modules of sensor modules 104 and 119, or an indicator may be arranged to be exposed through a display 101. For example, the camera module 105, the sensor module 104, or the indicator may be arranged in the internal space of an electronic device 100 so as to be brought into contact with an external environment through an opening of the display 101, which is perforated up to a front plate 102. In another embodiment, some sensor modules 104 may be arranged to perform their functions without being visually exposed through the front plate 102 in the internal space of the electronic device. For example, in this case, an area of the display 101 facing the sensor module may not require a perforated opening.

According to various embodiments, an electronic device may include a housing, and a coating layer formed on at least a portion of a surface of the housing, where the coating layer comprises a paint, the paint including a one-component acrylate-based paint having a property of being cured by an ultraviolet (UV) light, or a one-component or two-component paint containing acryl and urethane and having a property of being cured by heat, where the coating layer has a pattern structure including an uneven pattern through laser processing on a portion of a coating film formed by applying the paint, and where two or more regions having different glossiness may exist on the surface of the housing by the pattern structure of the coating layer.

According to an embodiment, the coating film formed by applying the paint may be a transparent glossy film.

According to an embodiment, in the coating layer, a first region that does not include the uneven pattern may be a transparent glossy region, and a second region that includes the uneven pattern may have a relatively low gloss compared to the transparent glossy region of the first region.

According to an embodiment, the pattern structure may include a standardized shape in which the uneven pattern is arranged in accordance with a specific rule.

According to an embodiment, the pattern structure may further include an unstandardized shape in which another uneven pattern is irregularly arranged.

According to an embodiment, the pattern structure may include two or more types of uneven patterns having different ranges of uneven depth, and the coating layer may have three or more regions with different glossiness.

According to an embodiment, a thickest portion of the coating layer may have a thickness of 20 to 40 μm, and the uneven pattern included in the pattern structure may have an uneven depth of 2 to 15 μm.

According to an embodiment, the pattern structure may include a combination of a first uneven pattern having an uneven depth of 2 to 10 μm and a second uneven pattern having an uneven depth of 5 to 15 μm.

According to an embodiment, a base material of the housing may be formed using at least one material of a synthetic resin, a glass, a film, a metal, and a composite material, and the coating layer may be formed on the base material.

According to an embodiment, the base material may be formed to include a transparent or opaque polycarbonate resin material.

According to an embodiment, at least one layer selected from a color layer, a shielding layer, and a deposition layer may be laminated on at least one surface of the base material.

According to an embodiment, when the at least one layer is laminated on an upper layer of the base material, the coating layer may be formed on the at least one layer.

According to an embodiment, the electronic device may further include a protective layer formed on the coating layer so as to prevent contamination and scratches.

According to an embodiment, the housing may be a protective cover for protecting at least a partial area of the electronic device.

According to various embodiments, a method for manufacturing a housing of an electronic device may include preparing a base material, and forming a coating layer on the base material, where forming the coating layer includes forming a transparent glossy film by applying a paint on the base material, the paint being a one-component acrylate-based paint having a property of being cured by a UV light source, or the paint being a one-component or two-component paint containing acryl and urethane and having a property of being cured by heat; and forming a pattern structure having an uneven pattern by performing laser processing on a portion of the transparent glossy film, whereby two or more regions having different glossiness exist on a surface of the housing.

According to an embodiment, forming the transparent glossy film may be performed by a spindle painting method or a flow coating method.

According to an embodiment, forming the pattern structure may be performed using blasting processing together with the laser processing.

According to an embodiment, preparing the base material may include injecting a material including a transparent or opaque polycarbonate resin.

According to an embodiment, the method may further include laminating at least one layer selected from a color layer, a shielding layer, and a deposition layer on at least one surface of the base material, where laminating the at least one layer is performed before forming the coating layer.

According to an embodiment, the method may further include forming a protective layer on the coating layer so as to prevent contamination and scratches.

Figure 2:
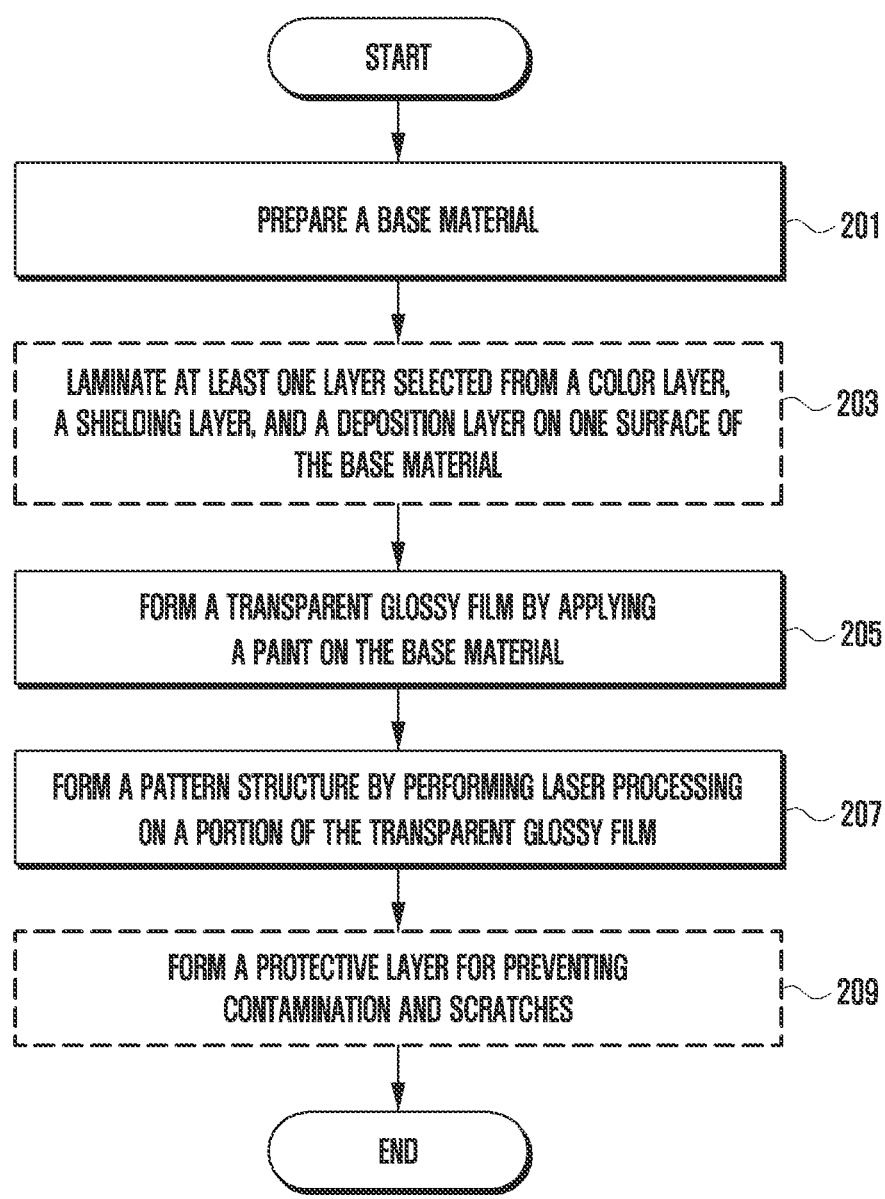
FIG. 2 is a flowchart illustrating a method for manufacturing a housing according to an embodiment of the disclosure.

FIG. 2 is a flowchart illustrating a method for manufacturing a housing according to an embodiment of the disclosure.

Figure 3A:
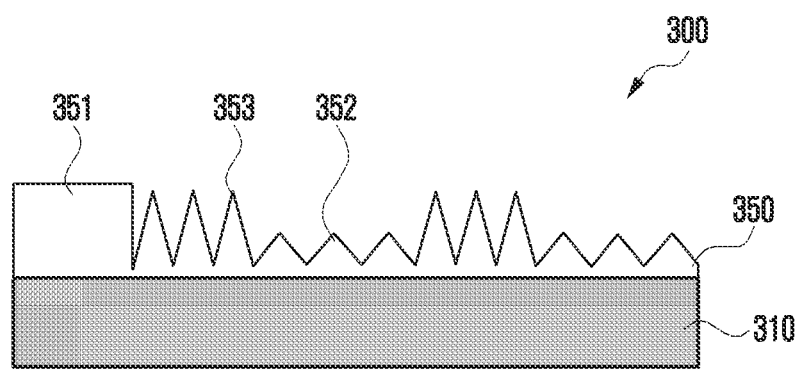
FIG. 3A is a cross-sectional view of a housing including a coating layer with at least one pattern structure according to an embodiment of the disclosure.
Figure 3B:
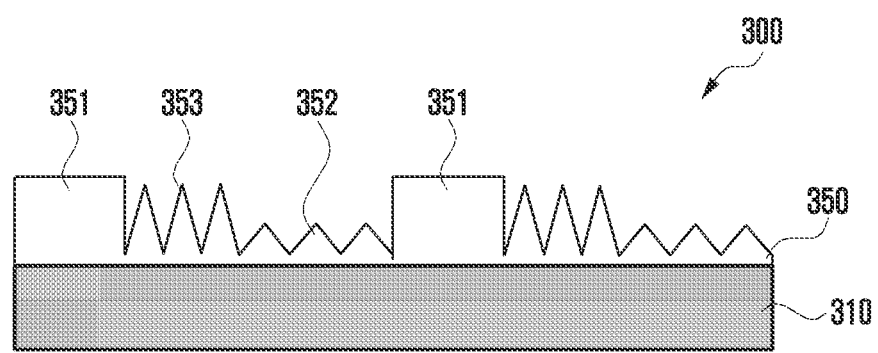
FIG. 3B is a cross-sectional view of a housing including a coating layer with at least one another pattern structure according to an embodiment of the disclosure.
Figure 3C:
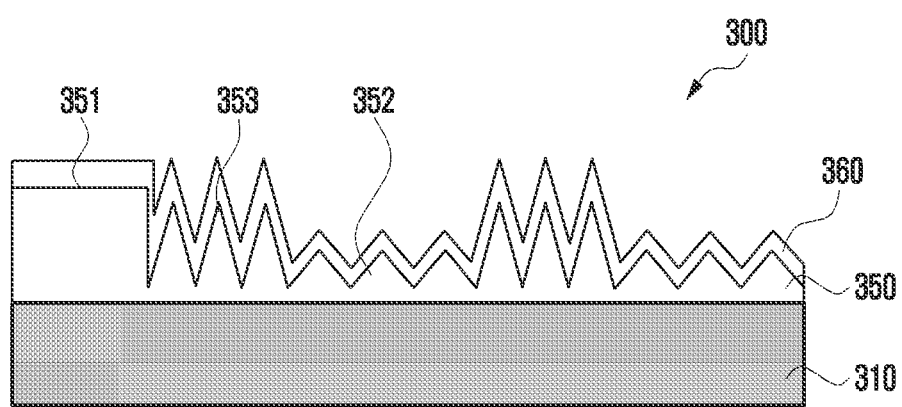
FIG. 3C is a cross-sectional view of a housing including a coating layer and at least one protective layer according to an embodiment of the disclosure.

FIGS. 3A to 3C are cross-sectional views of a housing including a coating layer with a pattern structure according to various embodiments of the disclosure.

Figure 4:
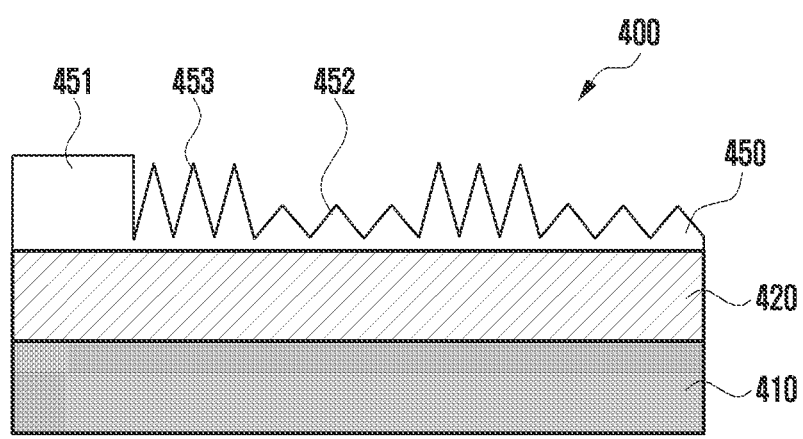
FIG. 4 is a cross-sectional view of a housing including a coating layer and at least one color layer according to an embodiment of the disclosure.
Figure 5:
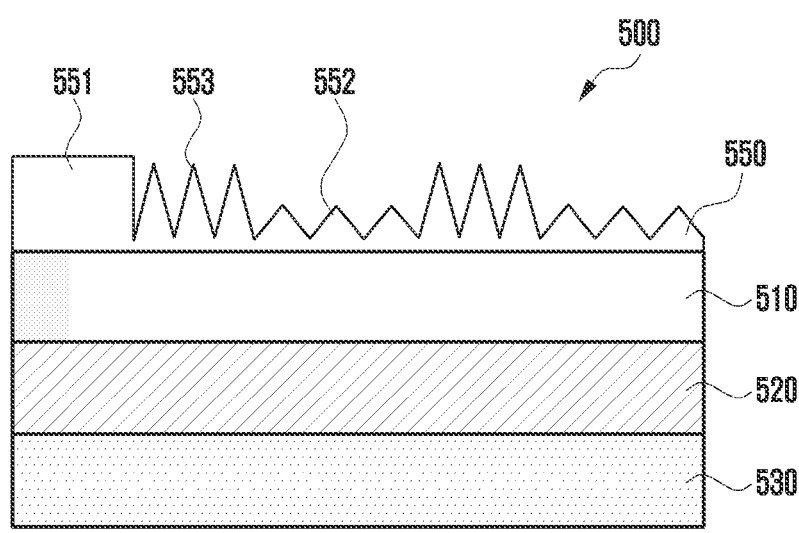
FIG. 5 is a cross-sectional view of a housing including a coating layer, at least one color layer, and at least one shielding layer according to an embodiment of the disclosure.
Figure 6:
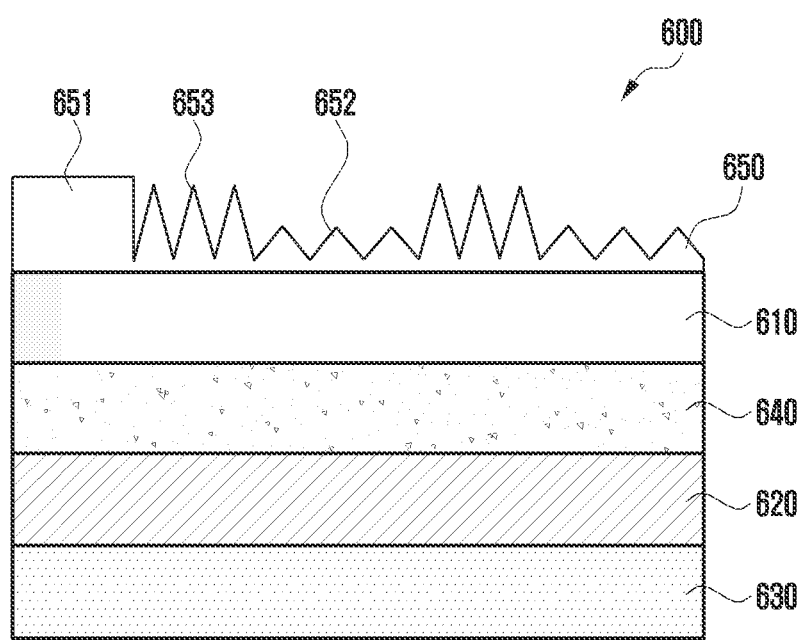
FIG. 6 is a cross-sectional view of a housing including a coating layer, at least one color layer, at least one shielding layer, and at least one deposition layer according to an embodiment of the disclosure.

FIGS. 4 to 6 are cross-sectional views of a housing including a coating layer and at least one layer other than the coating layer according to various embodiments of the disclosure.

Referring to FIG. 2, a base material 310 of a housing 300 may be prepared in operation 201. According to various embodiments, the base material 310 may be formed using at least one of a synthetic resin, a glass, a film, a metal, and a composite material. According to various embodiments, the base material 310 may be formed through pressing, injection, die casting, or mechanical bonding.

According to an embodiment, the base material 310 may be formed to include a synthetic resin material. According to an embodiment, the base material 310 may be formed to include a transparent, translucent or opaque polycarbonate resin material. According to an embodiment, the base material 310 may be formed to include an opaque polycarbonate resin material. According to an embodiment, the base material 310 may be formed to include a transparent polycarbonate resin material. According to an embodiment, the polycarbonate resin material may be a flame retardant treatment.

According to an embodiment, operation 201 of preparing the base material 310 may include a process of injecting a material including a transparent or opaque polycarbonate resin.

According to an embodiment, operation 201 of preparing the base material 310 may include performing corrosive machining on a portion of an injection mold for forming the base material 310 so as to generate a matted effect in a portion of a surface of the base material. Examples of the corrosive machining may include electro discharging machining or chemical corrosion.

According to various embodiments, operation 203 of FIG. 2 may be selectively performed. In operation 203, at least one layer selected from a color layer 420, 520 or 620, a shielding layer 530 or 630, and a deposition layer 640 may be laminated on at least one surface of the base material 310. Operation 203 may be performed before operation 205 to be described below, and the at least one layer laminated on one surface of the base material 310 in operation 203 may be located under a coating layer 350 according to various embodiments of the disclosure.

According to various embodiments, operations 205 and 207 of FIG. 2 are performed to form the coating layer 350 according to various embodiments of the disclosure on the base material 310.

According to various embodiments, in operation 205, a transparent glossy film may be formed by applying a paint on the base material 310.

According to an embodiment, the paint may be a one-component acrylate-based paint having a property of being cured by a UV light. According to an embodiment, the paint may be a one-component or two-component paint containing acryl and urethane and having a property of being cured by heat. If the paint is a one-component acrylate-based paint having a property of being cured by a UV light, or a one-component or two-component paint containing acryl and urethane and having a property of being cured by heat, it is possible to prevent the transparent glossy film from swelling or burning during laser processing, thereby forming uniform uneven patterns 352 and 353 on the coating layer 350.

According to an embodiment, operation 205 of forming the transparent glossy film may be performed by a method of forming a coating film to prevent scratches on the surface, such as a spindle painting method or a flow coating method.

According to various embodiments, in operation 207, a pattern structure having the uneven patterns 352 and 353 may be formed by performing laser processing on a portion of the transparent glossy film formed in operation 205. By the laser processing, the pattern structure having a standardized shape in which the uneven patterns 352 and 353 are arranged in accordance with a specific rule may be formed on the coating layer 350.

According to an embodiment, in order to generate precise, uniform, and fine uneven patterns, the laser processing may be performed using a micro-laser device of attosecond, picosecond, or femtosecond pulse units, such as a nano laser, which enables the realization of irregularities of 1 μm or less.

According to an embodiment, using the laser processing and computerized numerical control (CNC) processing in combination allows a pattern structure having more various standardized shapes to be formed on the coating layer 350.

According to an embodiment, operation 207 of forming the pattern structure may be performed using blasting processing together with the laser processing. The blasting processing allows a pattern structure, having an unstandardized shape in which the uneven patterns 352 and 353 are relatively irregularly arranged, to be formed on the coating layer 350. According to an embodiment, using the laser processing and the blasting processing together allows a pattern structure having both a standardized shape and an unstandardized shape to be formed on the coating layer 350. This may maximize differences in texture and gloss of such patterns and thus applied to various designs.

According to various embodiments, by performing operations 205 and 207, the coating layer 350 may be formed to allow two or more regions having different glossiness to exist on the surface of the housing 300.

According to various embodiments, operation 209 of FIG. 2 may be further performed to form a protective layer 360 on the coating layer 350 so as to prevent contamination and scratches.

According to an embodiment, operation 209 of forming the protective layer 360 may include water-repellent processing, oil-repellent processing, or water and oil-repellent processing. According to an embodiment, the water and oil-repellent processing may be performed by applying a water-repellent agent such as an anti-finger (AF) coating agent.

According to an embodiment, the protective layer 360 may have a thickness of 1 µm or less in order to prevent a difference between the glossy and matted textures from being deteriorated. Forming the protective layer 360 may prevent oil or foreign matters from occasionally getting caught and shiny between valleys of the pattern formed on the coating layer 350.

Referring to FIG. 3A, the coating layer 350 of the housing 300 according to various embodiments of the disclosure may be formed on the base material 310.

According to an embodiment, the base material 310 may be formed of an opaque polycarbonate resin material that is flame-retardant or not flame-retardant.

According to various embodiments, the coating layer 350 may be formed based on a transparent glossy film produced by coating a one-component acrylate-based paint having a property of being cured by a UV light, or coating a one-component or two-component paint containing acryl and urethane and having a property of being cured by heat. If the paint is a one-component acrylate-based paint having a property of being cured by a UV light, or a one-component or two-component paint containing acryl and urethane and having a property of being cured by heat, it prevents the transparent glossy film from swelling or burning during the laser processing, thereby forming the uniform uneven patterns 352 and 353 on the coating layer 350.

According to various embodiments, in the coating layer 350, a first region that does not include the uneven patterns 352 and 353 is a transparent glossy region 351, and a second region that includes the uneven patterns 352 and 353 is a region having relatively low gloss compared to the transparent glossy region of the first region.

According to an embodiment, the coating layer 350 may include a pattern structure having a standardized shape in which the uneven patterns 352 and 353 are arranged in accordance with a specific rule. Such a standardized shape may include various patterns and designs such as a dot pattern, a lattice pattern, a diagonal split pattern, and the like, and any combination of two or more types of standardized shapes may be included in the pattern structure.

According to an embodiment, the pattern structure may include two or more types of uneven patterns 352 and 353 having different ranges of uneven depth. Therefore, the coating layer 350 may have three or more regions with different glossiness.

According to an embodiment, the thickest portion of the coating layer 350 may have a thickness of 20 to 40 µm, and the uneven patterns 352 and 353 included in the pattern structure may have an uneven depth of 2 to 15 µm.

According to an embodiment, the pattern structure may include a combination of a first uneven pattern 352 having an uneven depth of 2 to 10 µm and a second uneven pattern 353 having an uneven depth of 5 to 15 µm.

According to an embodiment, the pattern structure may further include an unstandardized shape in which the above-mentioned uneven pattern or any other uneven pattern is irregularly arranged.

According to an embodiment, the housing 300 may be a protective cover for protecting at least a partial area of the electronic device.

Referring to FIG. 3B, the coating layer 350 according to an embodiment may have a pattern structure including a standardized shape in which the transparent glossy region 351 having no uneven pattern and the region having the uneven patterns 352 and 353 are arranged in accordance with a specific rule.

Referring to FIG. 3C, the housing 300 according to an embodiment may include the protective layer 360 formed on the coating layer 350. According to an embodiment, the protective layer 360 may have a thickness of 1 µm or less in order to prevent a difference in texture between the glossy and matte textures on the coating layer from being deteriorated.

Referring to FIG. 4, a housing 400 according to an embodiment may include a color layer 420 between a base material 410 and a coating layer 450. In addition, the housing 400 according to an embodiment may further include an additional layer other than the color layer 420, such as a deposition layer or a coating layer other than the coating layer 450, between the base material 410 and the coating layer 450. According to an embodiment, the base material 410 may be formed of an opaque polycarbonate resin material. The housing 400 may include a transparent glossy region 451, a first uneven pattern 452, and a second uneven pattern 453.

According to an embodiment, the color layer 420 may be formed by applying and then curing an acryl-based, olefin-based, or urethane-based resin or paint. The color layer 420 may be a single layer or multiple layers.

Referring to FIG. 5, a housing 500 according to an embodiment may include a color layer 520 and a shielding layer 530 under a base material 510. According to an embodiment, the base material 510 may be formed of a transparent polycarbonate resin material that is flame-retardant or not flame-retardant.

According to an embodiment, the shielding layer 530 may be an opaque layer. According to an embodiment, the shielding layer 530 may have, but is not limited to, a black color. According to an embodiment, the shielding layer 530 may be formed by processing heat-resistant ink in a printing method. The housing 500 may include a coating layer 550, a transparent glossy region 551, a first uneven pattern 552, and a second uneven pattern 553.

Referring to FIG. 6, a housing 600 according to an embodiment of the disclosure may include a color layer 620, a shielding layer 630, and a deposition layer 640 under a base material 610. According to an embodiment, the base material 610 may be formed of a transparent polycarbonate resin material. The housing 600 may include a coating layer 650, a transparent glossy region 651, a first uneven pattern 652, and a second uneven pattern 653.

According to an embodiment, the deposition layer 640 may be formed of a metal, a metal compound, or a material including the same, which exhibits a silver color or a high-brightness silver color. Examples of the material exhibiting the silver color may include tin, indium, aluminum, and the like. According to an embodiment, the deposition layer 640 may be formed through a deposition method such as a physical vapor deposition (PVD) or chemical vapor deposition (CVD) method.

Figure 7A:
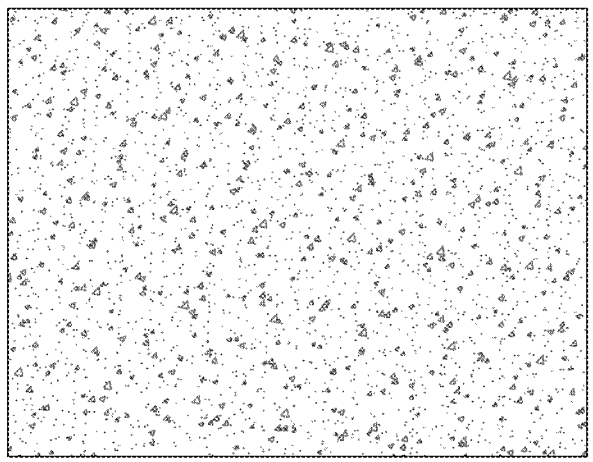
FIG. 7A illustrates changes of a paint after laser irradiation according to an embodiment of the disclosure.
Figure 7B:
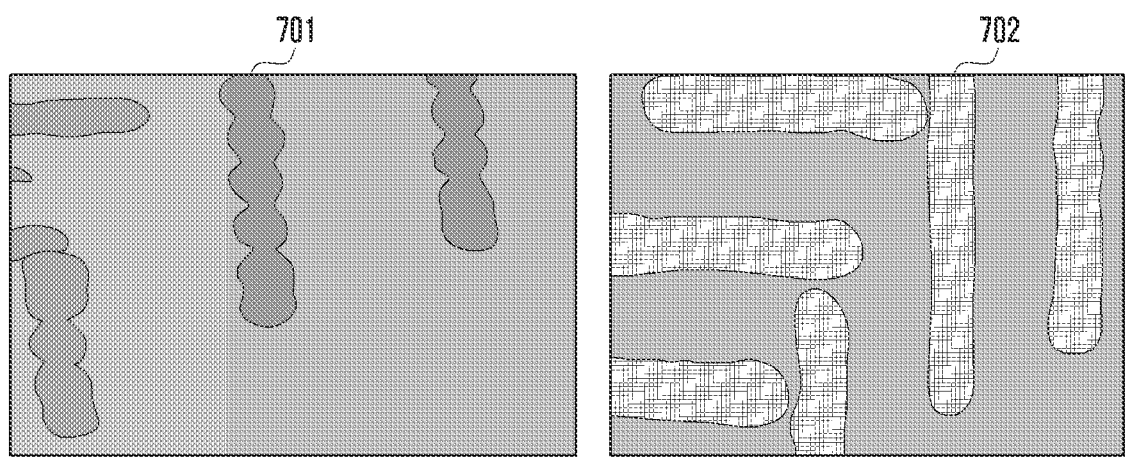
FIG. 7B illustrates changes of a paint after laser irradiation according to an embodiment of the disclosure.

FIG. 7A illustrates changes of a paint after laser irradiation according to an embodiment of the disclosure, and FIG. 7B illustrates changes of a paint (comparative) after laser irradiation according to an embodiment of the disclosure.

Referring to FIG. 7B, the polyester and urethane paint causes a phenomenon that a coating film swells (701) or burns (702) after laser irradiation. However, as shown in FIG. 7A, the paint according to various embodiments of the disclosure may produce a uniform unevenness on the whole after laser irradiation.

Figure 8A:
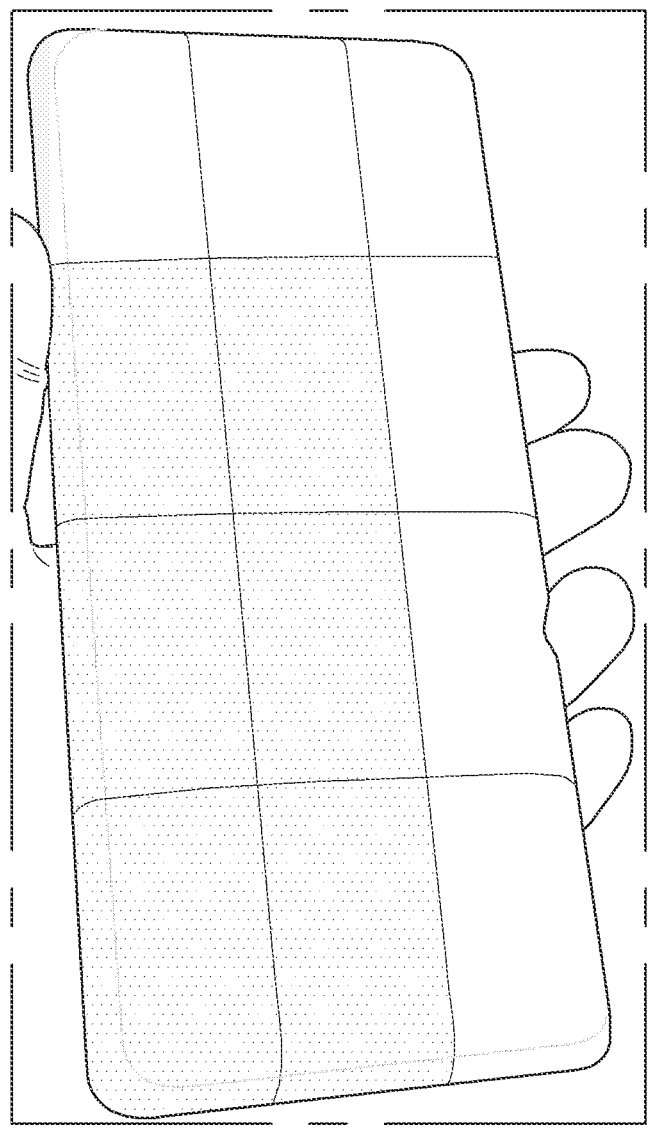
FIG. 8A illustrates an example of a housing including a coating layer with a pattern structure according to an embodiment of the disclosure.
Figure 8B:
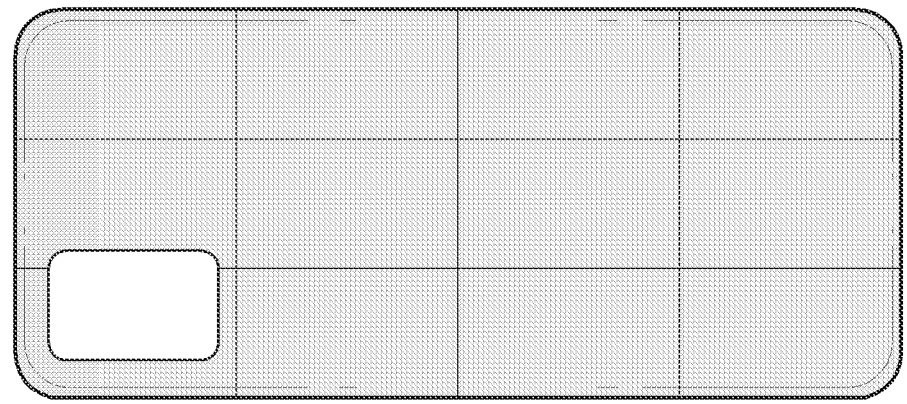
FIG. 8B illustrates an example of a housing including a coating layer with a pattern structure according to an embodiment of the disclosure.
Figure 8B:
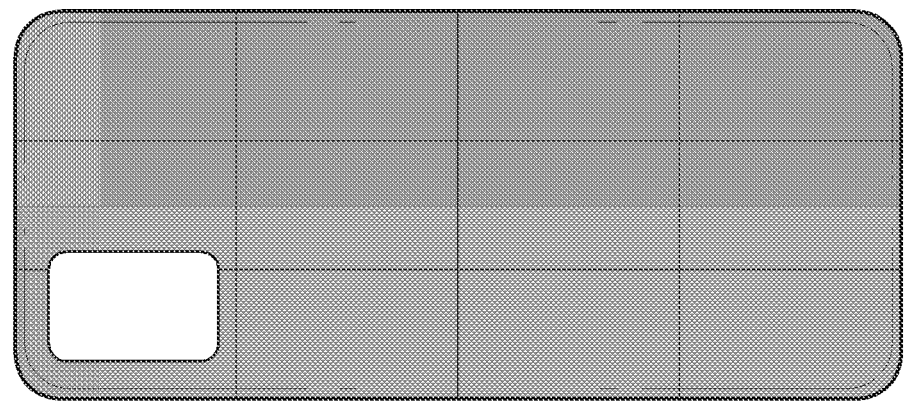
Figure 8B:
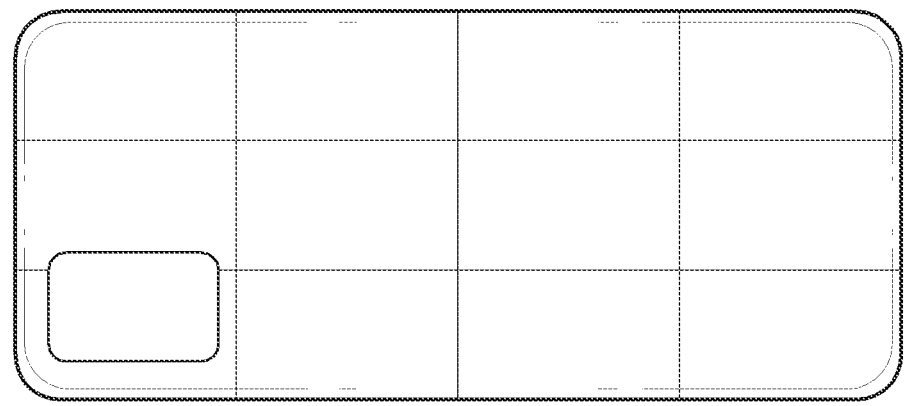

FIG. 8A illustrates an example of a housing including a coating layer with a pattern structure according to an embodiment of the disclosure, and FIG. 8B illustrates an example (comparative) of a housing including a coating layer with a pattern structure according to an embodiment of the disclosure. FIG. 8B shows a housing manufactured using a method similar to that of FIG. 2 but by using blasting processing instead of laser processing in operation 207. In this case, a coating layer including an uneven pattern having an uneven depth of a certain range is not formed on the surface of the housing, and thus a difference in texture between glossy and matte textures is not exhibited. In contrast, FIG. 8A shows a housing manufactured using the method shown in FIG. 2. In this case, a coating layer is formed on the surface of the housing so as to have a pattern structure including an uneven pattern having an uneven depth of a certain range, and a plurality of regions having different glossiness exist. In this case, a difference in texture between a glossy region and a matted region is clear, and a standardized pattern structure based on the difference in the glossy and matted texture can be freely formed.

According to various embodiments of the disclosure, it is possible to provide an electronic device in which contamination and scratches are prevented, multiple textures of glossy and matte are implemented through a housing including a coating layer having an uneven pattern formed with an uneven depth of a predetermined range, and a standardized pattern based on a difference in glossiness is elaborately implemented. Also, it is possible to provide a method for manufacturing the housing included in the electronic device.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing; and
a laser-processed coating film formed on at least a portion of a surface of the housing,
wherein the laser-processed coating film comprises a paint, the paint including a one-component acrylate-based paint having a property of being cured by an ultraviolet (UV) light, or a one-component or two-component paint containing acryl and urethane and having a property of being cured by heat,
wherein the laser-processed coating film has a pattern structure including an uneven pattern through laser processing on a portion of a coating film formed by applying the paint, the uneven pattern including a plurality of groups of peaks having heights different from each other, and
wherein the laser-processed coating film has multiple textures including glossy and matte such that the surface of the housing includes two or more regions having different glossiness.

2. The electronic device of claim 1, wherein the laser-processed coating film comprises a transparent glossy region.

3. The electronic device of claim 1, wherein in the laser-processed coating film, a first region that does not include the uneven pattern is a transparent glossy region, and a second region that includes the uneven pattern has a relatively low gloss compared to the transparent glossy region of the first region.

4. The electronic device of claim 1, wherein the pattern structure includes a standardized shape in which the uneven pattern is arranged in accordance with a specific rule.

5. The electronic device of claim 4, wherein the pattern structure further includes an unstandardized shape in which another uneven pattern is irregularly arranged.

6. The electronic device of claim 1,
wherein the pattern structure includes two or more types of uneven patterns having different ranges of uneven depth, and
wherein the laser-processed coating film has three or more regions with different glossiness.

7. The electronic device of claim 1,
wherein a thickest portion of the laser-processed coating film has a thickness of 20 to 40 μm, and
wherein the uneven pattern included in the pattern structure has an uneven depth of 2 to 15 μm.

8. The electronic device of claim 7, wherein the pattern structure includes a combination of a first uneven pattern having an uneven depth of 2 to 10 μm and a second uneven pattern having an uneven depth of 5 to 15 μm.

9. The electronic device of claim 1,
wherein a base material of the housing is formed using at least one material of a synthetic resin, a glass, a film, a metal, or a composite material, and
wherein the laser-processed coating film is formed on the base material.

10. The electronic device of claim 9, wherein the base material is formed to include a transparent or opaque polycarbonate resin material.

11. The electronic device of claim 9, wherein at least one layer selected from a color layer, a shielding layer, or a deposition layer is laminated on at least one surface of the base material.

12. The electronic device of claim 11, wherein when the at least one layer is laminated on an upper layer of the base material, the laser-processed coating film is formed on the at least one layer.

13. The electronic device of claim 1, further comprising:
a protective layer formed on the laser-processed coating film so as to prevent contamination and scratches.

14. The electronic device of claim 1, wherein the housing is a protective cover for protecting at least a partial area of the electronic device.

15. A method for manufacturing a housing of an electronic device, the method comprising:
preparing a base material; and
forming a laser-processed coating film on the base material, wherein forming the laser-processed coating film includes:
  forming a transparent glossy film by applying a paint on the base material, the paint being a one-component acrylate-based paint having a property of being cured by a UV light source, or the paint being a one-component or two-component paint containing acryl and urethane and having a property of being cured by heat, and
  forming a pattern structure having an uneven pattern by performing laser processing on a portion of the transparent glossy film, the uneven pattern including a plurality of groups of peaks having heights different from each other,
whereby the laser-processed coating film has multiple textures including glossy and matte such that a surface of the housing includes two or more regions having different glossiness.

16. The method of claim 15, wherein forming the transparent glossy film is performed by a spindle painting method or a flow coating method.

17. The method of claim 15, wherein forming the pattern structure is performed using blasting processing together with the laser processing.

18. The method of claim 15, wherein preparing the base material includes injecting a material including a transparent or opaque polycarbonate resin.

19. The method of claim 15, further comprising:
laminating at least one layer selected from a color layer, a shielding layer, or a deposition layer on at least one surface of the base material,
wherein laminating the at least one layer is performed before forming the laser-processed coating film.

20. The method of claim 15, further comprising:
forming a protective layer on the laser-processed coating film so as to prevent contamination and scratches.

* * * * *